United States Patent
Huang

(10) Patent No.: US 7,384,688 B2
(45) Date of Patent: Jun. 10, 2008

(54) CONNECTING STRUCTURE USED IN A LIQUID CRYSTAL DISPLAY PANEL

(75) Inventor: Hsin-Tao Huang, Shin-Ju (TW)

(73) Assignee: AU Optronics Corporation, Hsin-Chu (TW)

( * ) Notice: Subject to any disclaimer, the term of this patent is extended or adjusted under 35 U.S.C. 154(b) by 0 days.

(21) Appl. No.: 10/833,172

(22) Filed: Apr. 28, 2004

(65) Prior Publication Data

US 2005/0147808 A1     Jul. 7, 2005

(30) Foreign Application Priority Data

Jan. 5, 2004    (TW) .............................. 93100181 A

(51) Int. Cl.
*B32B 5/16*     (2006.01)
(52) U.S. Cl. ...................... 428/323; 428/328
(58) Field of Classification Search ............. None
See application file for complete search history.

(56) References Cited

U.S. PATENT DOCUMENTS

| | | | |
|---|---|---|---|
| 5,087,494 A * | 2/1992 | Calhoun et al. | 428/40.1 |
| 6,180,226 B1 * | 1/2001 | McArdle et al. | 428/332 |
| 6,194,492 B1 * | 2/2001 | Sakurai et al. | 523/515 |
| 6,592,783 B2 * | 7/2003 | Kumakura et al. | 252/500 |
| 2001/0008169 A1 * | 7/2001 | Connell et al. | 156/298 |

\* cited by examiner

*Primary Examiner*—Monique R. Jackson
(74) *Attorney, Agent, or Firm*—Harold L. Novick; Matthew J. Moffa; The Nath Law Group

(57) ABSTRACT

A conductive material with a laminated structure is provided. The conductive material with a laminated structure of the present invention includes at least a polymer plastic layer, where conductive particles are dispersed on surfaces. When the conductive material is used to press join terminals of a driving component and a glass substrate, junction impedance between the terminals is reduced. The purpose of joining with super-fine pitches is achieved.

17 Claims, 4 Drawing Sheets

CONNECTING STRUCTURE USED IN A LIQUID CRYSTAL DISPLAY PANEL

BACKGROUND OF THE INVENTION

1. Field of the Invention

The present invention relates to a conductive material with a laminated structure, and more particularly to a conductive material with a laminated structure, where conductive particles are dispersed on the surfaces.

2. Description of the Prior Art

Spherical conductive particles are generally used for providing electrical conductance between the terminals of the glass substrate and the driving component of a conventional liquid crystal display, as shown in FIG. 1A to FIG. 1C. A conductive material 3 is coated on or adhered to the surface of the glass substrate 1, on which terminals 2 are formed. Then, the surface of the driving component 4, on which terminals 5 are formed, is joined to the surface of the glass substrate 1, on which terminals 2 are formed, in a manner of terminal-to-terminal alignment by the conductive material 3. Electrical conductance occurs between the terminals 2 and 5 in Z direction; electrical insulation occurs at the direction of X-Y plane.

The conductive material 3 is formed of a thermoplastic layer or a thermosetting layer, where spherical conductive particles 31 are evenly dispersed, as shown in FIG. 2A. However, it is necessary to apply external electrical and magnetic fields on the conductive material 3 to evenly distribute the conductive particles 31 in the conductive material 3 to prevent the conductive particles 31 from clustering. It is also necessary to use equipment to control accuracy. The manufacturing cost is thus increased.

Moreover, when the terminal 5 of the driving component 4 is press jointed to the terminal 2 of the glass substrate 1 of the liquid crystal display by the conductive material 3, electrical conductance in Z direction between the terminals 2 and 5 is established via the conductive particles 31, as shown in FIG. 2B. Because the conductive particles 31 are squeezed between the glass substrate 1 and the driving component 4, a short circuit may occur among the conductive particles 31 outside the joining region of the terminals 2 and 5. That is, an un-expected electrical conductance at the direction of X-Y plane is established, as shown in part A of FIG. 2B.

With the increasing requirement for higher resolution and for smaller size in connection with a liquid crystal display, it is necessary to have a shorter pitch between the terminal 2 of the glass substrate 1 and the terminal 5 of the driving component 4. As a result, junction impedance between the terminals 2 and 5 would be increased due to the reduction of the joining area. To satisfy the requirement for fine pitch, the size of the conductive particles 31 needs to be reduced. As a result, the level of difficulty in fabricating the conductive particles 31 and the manufacturing cost are increased. Besides, the surface roughness of the terminals 2 and 5 also limits the development of small-size conductive particles 31. When the size of the conductive particles 31 is smaller than what the surface roughness of the terminals 2 and 5, may permit bad electrical conductance would occur. When the density of the conductive particles 31 is increased, the requirement for joining with fine pitch cannot be attained, although the junction impedance can be reduced. Owing to the above considerations, the conventional conductive material is applied for joining in case of pitches larger than 50 microns.

Accordingly, it is desirable to provide a conductive material, which can overcome the above drawbacks and is suitable for fine-pitch joining between the terminals of the liquid crystal display and the driving component.

SUMMARY OF THE INVENTION

One objective of the present invention is to provide a conductive material with a laminated structure, which includes at least a polymer plastic layer, where conductive particles are dispersed on surfaces, a density of the conductive particles on the unit surface area can be decreased so as to satisfy a requirement for micro-pitch joining.

Another objective of the present invention is to provide a conductive material with a laminated structure, which includes at least a polymer plastic layer, where conductive particles are dispersed on surfaces, a density of the conductive particles dispersed on the surfaces of the polymer plastic layer is readily controlled without adding external electrical and magnetic fields. The manufacturing cost can be reduced.

In order to achieve the above objectives, the present invention provides a conductive material with a laminated structure, which can be used to join terminals of a driving component and a glass substrate. The conductive material with a laminated structure under the present invention includes at least a polymer plastic layer, where conductive particles dispersed on surfaces. The density of the conductive particles on the unit surface area of each polymer plastic layer can be decreased due to the conductive particles dispersed on the surfaces of the polymer plastic layers. Besides, the conductive particles are isolated from each other by the polymer plastic layers in a portion of the conductive material outside the joining region of the terminals. Hence, a phenomenon of short circuit between the conductive particles in the portion of the conductive material outside the joining region of the terminals is prevented. Moreover, the laminated conductive material of the present invention provides three mechanisms to attain the purpose of fine pitch bonding: (1) Increasing the lamination layers of the conductive material while keeping the conductive particles per unit volume constant. The number of the conductive particles per unit surface area thus can be decreased, and the probability for occurring short circuit of the conductive particles outside the joining region is reduced. The space between the terminals can be shrunk, and therefore the fine pitch bonding can be obtained; (2) the conductive material of the present invention utilizes non-spherical (such as elliptical, flat, sheet, fibered or irregular)conductive particles. The junction impedance between the terminals can be lowered. As a consequence, the pitch between the terminals can be shrunk to attain the purpose of fine-pitch joining; (3) the conductive material of the present invention utilizes non-spherical conductive particles. The non-spherical conductive particles do not easily flow away compared to the conventional spherical particles when joining the terminals. Therefore, the non-spherical conductive particles provide the advantage of clustering, which is advantageous for shrinking the pitch between the terminals. And thus, the purpose of fine-pitch joining can be obtained. The conductive material of the present invention is suitable for an application in a liquid crystal display with super-fine pitches.

BRIEF DESCRIPTION OF THE DRAWINGS

The objectives, features and advantages of the present invention will become apparent from the following detailed description, in light of the accompanying drawings.

DESCRIPTION OF THE EMBODIMENTS

The present invention provides a conductive material with a laminated structure, which includes at least a polymer plastic layer, where conductive particles are dispersed on surfaces. The polymer plastic layer can be formed of thermoplastic polymer or thermosetting polymer. When the present conductive material is used to press join terminals of a driving component and a glass substrate, junction impedance between the terminals is reduced. The purpose of obtaining a super-fine pitch is achieved.

More specifically, the conductive material with a laminated structure of the present invention is formed of laminated thermoplastic polymer layers or laminated thermosetting polymer layers, where conductive particles are dispersed on the surfaces of the thermoplastic polymer layers or the thermosetting polymer layers. The density and uniformity of distribution of the conductive particles on the surfaces of the polymer plastic layers can be readily controlled. As the conductive particles are distributed on the surfaces of the laminated polymer plastic layers, the number of the conductive particles per unit surface area (the density of the conductive particles) of a single surface of the polymer plastic layer can be smaller, compared with the conventional conductive material with the conductive particles dispersed therein. However, after press joining the terminals of a driving component and a glass substrate by the present conductive material with a laminated structure, the number of the conductive particles within the joining region between the terminals is equal to a sum of the numbers of conductive particles on all the surface portions of the laminated polymer plastic layers in the joining region. The present conductive material with a laminated structure thus can provide electrical conductance between the terminals as the conventional conductive material.

Figure 1A:
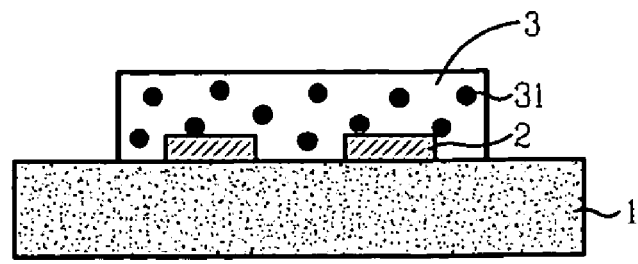
FIG. 1A to FIG. 1C are various cross-sectional views of a flow process of joining terminals of a glass substrate and a driving component by a conventional conductive material.
Figure 1B:
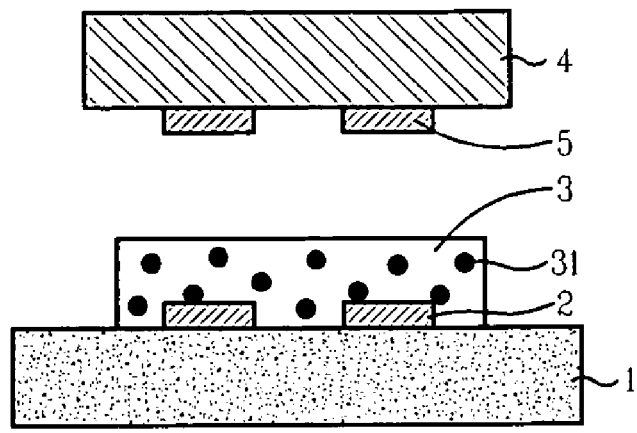
Figure 1C:
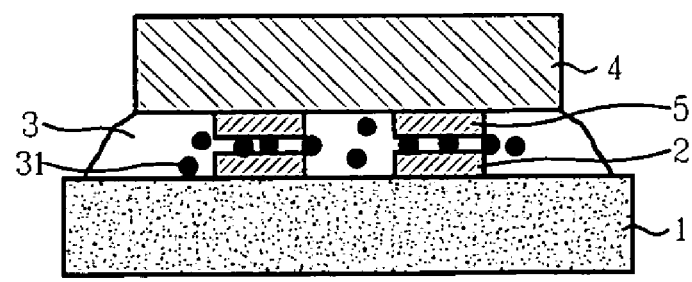
Figure 2A:
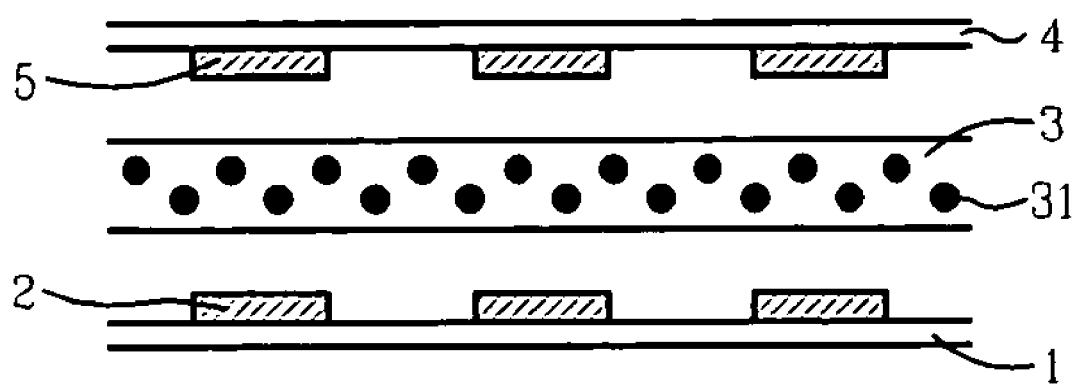
FIG. 2A to FIG. 2B are various cross-sectional views of a flow process of joining terminals of the glass substrate and the driving component by a known conductive material, where conductive particles are dispersed.
Figure 2B:
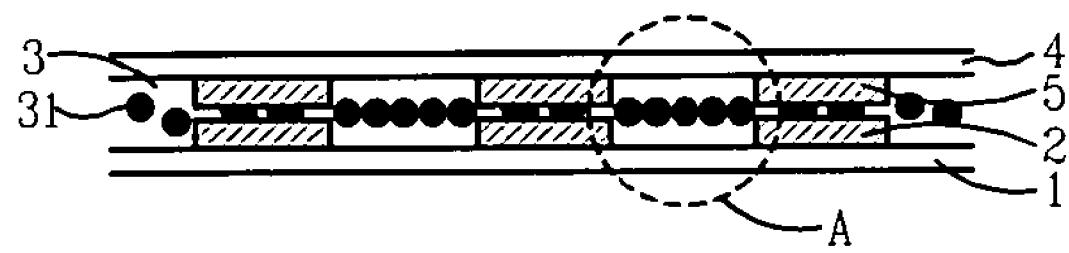

Besides, the density of the conductive particles on unit surface area of a single surface of the laminated polymer plastic layers is decreased, and the conductive particles are isolated from each other by the polymer plastic layer in a portion of the conductive material outside the joining region of the terminals. Hence, a phenomenon of short circuit between the conductive particles in the portion of the conductive material outside the joining region of the terminals, as shown in A part of FIG. 2B, can be prevented.

The conductive material with a laminated structure of the present invention can be a single-layer structure or a multi-layer structure. When the present conductive material is provided with a multi-layer structure, the conductive particles can be dispersed on the surfaces of each polymer plastic layer so as to decrease the number of the conductive particles per unit surface area of a single polymer plastic layer (i.e. the density of the conductive particles). As a consequence, a pitch between the terminals of the driving component and the glass substrate can be made smaller. As the laminated layers are increased and in case that the number of the conductive particles per unit volume is constant, the number of the conductive particles per unit surface area of each single polymer plastic layer would be decreased. The pitch between the terminals thus can further be made smaller. The relationship between the pitch and the number of the lamination layers can be represented by the following formula:

$$P=T+S$$

$$A=T+S/(n+1)$$

$$n=T_h/(2*B)$$

$$A<P$$

wherein P=pitch;

T=terminal width (lead width);

S=space between terminals;

A=Expected pitch of the conductive material with laminated structure;

n=number of lamination layers;

$T_h$=thickness of conductive material; and

B=diameter of the conductive particle.

The pitch between the terminals can be made smaller as the lamination layers of the present conductive material increases. However, the distance between the glass substrate and the driving component is constant, the more the lamination layers are, the less the thickness of each layer is. As a result, insulating impedance between the laminated layers is insufficient. The possibility of a short circuit is increased. It is proper that the lamination layers of the present conductive material is between 1 and 20, more preferably between 1 and 10, and most preferably between 1 and 5.

When the present conductive material includes at least two laminated polymer plastic layers, the conductive particles can be dispersed on the surface of at least one of the two laminated polymer plastic layers between an interface.

Additionally, the conductive particles can be randomly dispersed on the surfaces of the polymer plastic layers of the present conductive material. It is unnecessary to define the orientation distribution of the conductive particles. The random distribution of the conductive particles on the surfaces of the polymer plastic layers would further make fine-pitch joining possible.

The density of the conductive particles per unit surface area of the present conductive material can be reduced. Hence, the present conductive material can be used in a liquid crystal display with super-fine pitch, which is even less than 25 microns.

The conductive particles of the present conductive material can be a kind of low-resistant metal material, for example, selected from a group consisting of gold, silver, copper, aluminum, nickel, stainless steel or carbon or a combination thereof. The shape of the conductive particles can be spherical, circular, elliptical, flat, sheet, rod, fibred or even irregular.

As the shape of the conductive particles is fibred or rod, a linear contact between the conductive particles and terminals is established upon press joining the terminals with the present conductive material. The junction impedance is thus lower than that of the conductive particles in other shapes.

When a metal is to be molded to the fibred conductive particles, firstly, the metal is molded to a foil shape, and then finished to a fibred shape by a cutting technique. The fibred conductive particles also can be fabricated by a fiber process with a high-pressure steam jet, a molten fiber spinning process or a metal fiber molding method proposed by U.S. Pat. No. 6,074,752, entitled "METAL FIBRE AGGLOMERATE AND PROCESS FOR MANUFACTURING THE SAME", metal fiber fabrication provided by a Taiwan Patent Publication No. 511406, or a nanometer fiber technology.

The dimension of the conductive particles can be in micrometers or even in nanometers. A height-to-width ratio of the conductive particles can be in a range of between about 0.2 and 1. When the height-to-width ratio is less than 0.2, the diameters of the conductive particles would be smaller than what the surface roughness of the terminals may permit, and this would cause bad joining. The signals cannot be effectively transferred. When the height-to-width ratio is equal to 1, the spherical conductive particles dispersed on the surfaces of the polymer plastic layer may be shifted as the polymer plastic layer as softened flows. As a result, the distribution of the conductive particles on the terminals would become uneven. However, the above problem can be avoided by the polymer plastic layer that has some adhesiveness. To satisfy the requirements for fine pitch and low impedance, it is preferable to use non-spherical conductive particles having the height-to-width ratio not equal to 1 in the conductive material of the present invention. It is more preferable to use fibred conductive particles in the conductive material of the present invention. This is because the polymer plastic layer as softened flows, the fibred conductive particles dispersed on the surfaces of the polymer plastic layer are merely distorted and would not flow away, and this would not result in insufficiency of the conductive particles on the terminals.

When the present conductive material is used to join the terminals of the glass substrate and the liquid crystal display, after press joining, the electrical joining is established by a kind of linear-type adhesion so as to reduce junction impedance. Moreover, the relationship between the pitch and the density of the conductive particles is linear. The number of the conductive particles per unit surface area of the present conductive material can be ⅕ to ½ times the number of the conductive particles of the conventional conductive material. Therefore, it is possible to satisfy the requirement of joining with fine pitch.

The present invention will be described in detail in accordance with embodiments in light of the accompanying drawings.

Figure 3A:
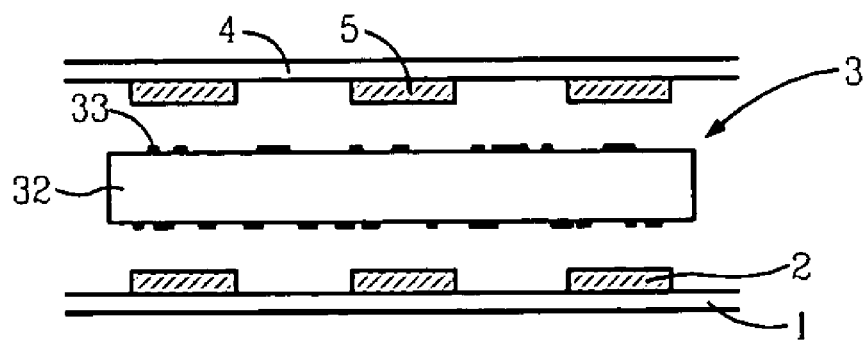
FIG. 3A to FIG. 3C are various cross-sectional views corresponding to respective stages of a flow process for joining the terminals of the glass substrate and the driving component by a conductive material in accordance with the first embodiment of the present invention.
Figure 3B:
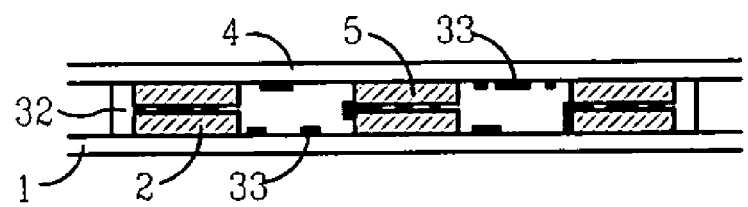
Figure 3C:
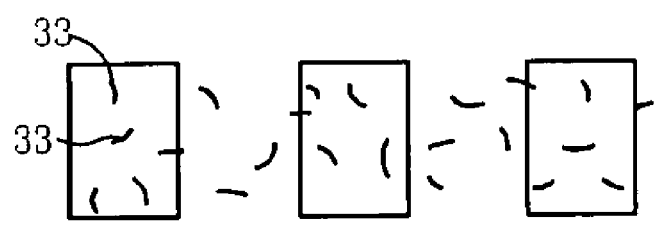

FIG. 3A to FIG. 3C are various cross-sectional views corresponding to respective stages of a flow process for joining the terminals of the glass substrate and the liquid crystal display by the conductive material in accordance with the first embodiment of the present invention. Referring to FIG. 3A, the conductive material 3 with a laminated structure of the first embodiment includes a polymer plastic layer 32, where fibred conductive particles 33 are dispersed on the surfaces. The fibred conductive particles 33 are evenly distributed on the two surfaces of the polymer plastic layer 32. The conductive material 3 is applied on a surface of the glass substrate 1, on which terminals 2 are formed. Then, the driving component 4 is press joined to the glass substrate 1 in a manner of terminal to terminal alignment. After press joining, the conductive particles 33 would touch the terminals 2 and 5, thus producing electrical connection between the terminals 2 and 5 (a Z-axis electrical connection). While the conductive particles 33 outside the joining region of the terminals 2 and 5 are isolated from each other by the polymer plastic layer 32, and there is not any electrical connection established (i.e. there is not any electrical connection in X and Y directions), as shown in FIG. 3B.

FIG. 3C is a schematic top view of FIG. 3B. The distribution of the conductive particles 33 of the conductive material 3 can be seen from FIG. 3C. The total number of the conductive particles 33 of the conductive material 3 is equal to the sum of the numbers of the conductive particles 33 dispersed on the two surfaces of the polymer plastic layer 32. Therefore, under the situation of obtaining a density of the conductive particles 33 the same as that of the conventional conductive material, the conductive material 3 can be provided with a lower density of the conductive particles 33 per unit surface area on the two surfaces of the polymer plastic layer 32. Thus, the surface portions of the conductive material 3 outside the joining region of the terminals 2 and 5 can be provided with the conductive particles 33 having a lower density per unit surface area. When the particle density per unit surface area is low, the probability of the electrical short outside the joining region is low, too. It means the joining with fine pitch can be achieved. Besides, the fibred conductive particles 33 become linearly joining with the terminals 2 and 5 after press joining. Low junction impedance can be obtained.

Figure 4A:
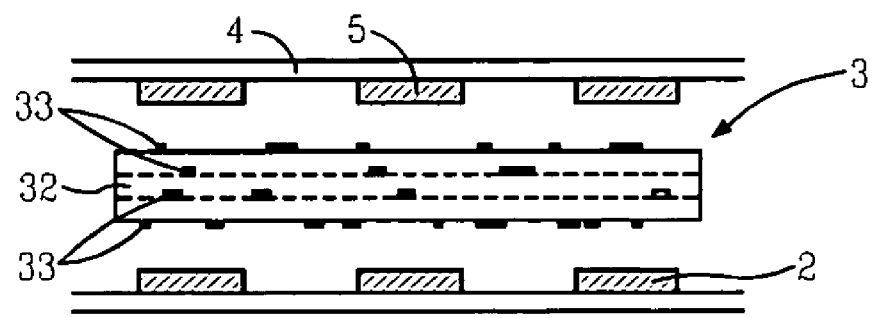
FIG. 4A to FIG. 4C are various cross-sectional views corresponding to respective stages of a flow process for joining the terminals of the glass substrate and the driving component by a conductive material in accordance with the second embodiment of the present invention.
Figure 4B:
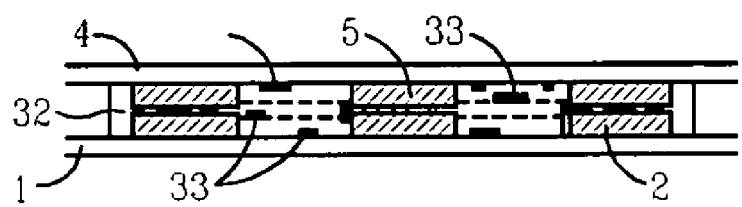
Figure 4C:
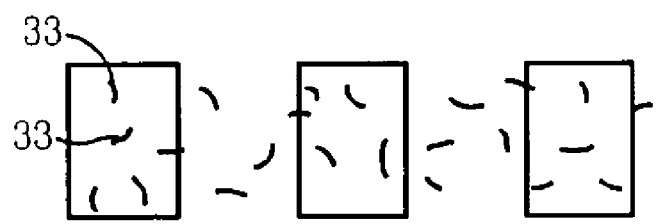

FIG. 4A to FIG. 4C are various cross-sectional views corresponding to respective stages of a flow process for joining the is terminals of the glass substrate and the liquid crystal display by a conductive material in accordance with the second embodiment. Referring to FIG. 4A, the conductive material 3 with a laminated structure of the second embodiment includes three laminated polymer plastic layers 32, where fibred conductive particles 33 are dispersed on the surfaces. The conductive particles 33 are evenly distributed on the surfaces of the three polymer plastic layers 32, while the conductive particles 33 are merely dispersed on the surface of one of the two laminated polymer plastic layers 32 between an interface. The conductive material 3 is applied on a surface of the glass substrate 1, where the terminals 2 are formed. Then, the driving component 4 is press joined to the glass substrate 1 in a manner of terminal to terminal alignment. After press joining, the conductive particles 33 would touch the terminals 2 and 5, thus producing electrical connection between the terminals 2 and 5 (a Z-axis electrical connection). While the conductive particles 33 outside the joining region of the terminals 2 and 5 are isolated from each other by the laminated polymer plastic layers 32, there is not any electrical connection established (i.e. there is not any electrical connection in X and Y directions), as shown in FIG. 4B.

FIG. 4C is a schematic top view of FIG. 4B. The distribution of the conductive particles 33 of the conductive material 3 can be seen from FIG. 4C. The total number of the conductive particles 33 of the conductive material 3 is equal to the sum of the numbers of the conductive particles 33 dispersed on the surfaces of each of the polymer plastic layers 32. Owing to the three laminated structure of the conductive material 3 of the second embodiment and under the situation of obtaining a density of the conductive particles 33 the same as that of the conventional conductive material, the conductive material 3 can be provided with the conductive particles 33, which has a lower density per unit surface area than that of the first embodiment. Moreover, there is not any electrical connection established outside the joining region of the terminals 2 and 5. When the particle density per unit surface area is lowered, the joining with finer pitch is thus achieved.

The conductive material with a laminated structure of the present invention is provided with the conductive particles distributed in a form of laminated distribution. For example, the conductive particles 33 are distributed on the two surfaces of the polymer plastic layer 32 of FIG. 3. The density of the conductive particles per unit surface area thus can be decreased. Furthermore, since the conductive particles are dispersed on the surfaces of the polymer plastic layers, the density of the conductive particles is readily controlled without the necessity of adding electrical and magnetic fields to control the even of distribution of the conductive particles. The manufacturing cost can be reduced.

In addition, the density of the conductive particles per unit surface area of the conductive material of the present invention is decreased, and the conductive particles are isolated from each other by the laminated polymer plastic layers outside the joining region of the terminals. A phenomenon of short circuit between the conductive particles in the portion of the conductive material outside the joining region of the terminals can be prevented. The pitch also can be made smaller due to the lower density of the conductive particles per unit surface area.

To sum up, the laminated conductive material of the present invention provides three mechanisms to attain the purpose of fine pitch bonding: (1) Increasing the lamination layers of the conductive material while keeping the conductive particles per unit volume constant. The number of the conductive particles per unit surface area thus can be decreased, and the probability for occurring short circuit of the conductive particles outside the joining region is reduced. The space between the terminals can be shrunk, and therefore the fine pitch bonding can be obtained; (2) the conductive material of the present invention utilizes non-spherical conductive particles. The junction impedance between the terminals can be lowered. As a consequence, the pitch between the terminals can be shrunk to attain the purpose of fine-pitch joining; (3) the conductive material of the present invention utilizes non-spherical conductive particles. The non-spherical conductive particles do not easily flow away compared to the conventional spherical particles when joining the terminals. Therefore, the non-spherical conductive particles provide the advantage of clustering, which is advantageous for shrinking the pitch between the terminals. And thus, the purpose of fine-pitch joining can be obtained.

The embodiments are only used to illustrate the present invention, not intended to limit the scope of the invention. Modifications of the embodiments can be made in line with the spirit of the present invention.

What is claimed is:

1. A connecting structure used in a display panel, comprising:
    a substrate having a plurality of first terminals;
    an electrical component having a plurality of second terminals; and
    conductive material having laminated structure, wherein said conductive material comprises a plurality of laminated plastic layers with non-spherical conductive particles dispersed on the surfaces of said laminated plastic layers;
    wherein said conductive material is connected with said first terminals and said second terminals respectively;
    wherein the relationship between the pitch of a selected one of said first or second terminals and the number of said laminated plastic layers can be represented by the following formula:

$P=T+S$ $A=T+S/(n+1)$ $n=Th/(2*B)$ wherein P is said pitch, T is the terminal width of said selected terminal, S is space between said selected terminal and the other of said terminals, A is the expected pitch of said conductive material with laminated structure, n is number of said laminated plastic layers; Th is the thickness of said conductive material, and B is the diameter of said non-spherical conductive particle.

2. The connecting structure of claim 1, wherein said substrate comprises a glass substrate.

3. The connecting structure of claim 1, wherein said electrical component comprises a driving component.

4. The connecting structure of claim 1, wherein said plastic layer comprises a polymer plastic layer.

5. The connecting structure of claim 4, wherein said polymer plastic layer comprises a thermoplastic polymer layer.

6. The connecting structure of claim 4, wherein said polymer plastic layer comprises a thermosetting polymer layer.

7. The connecting structure of claim 1, wherein said non-spherical conductive particles are randomly dispersed on the surfaces of said plastic layers.

8. The connecting structure of claim 4, wherein said non-spherical conductive particles are randomly dispersed on the surfaces of said polymer plastic layers.

9. The connecting structure of claim 1, wherein said non-spherical conductive particles are formed of a material selected from a group consisting of gold, silver, copper, aluminum, nickel, stainless steel, carbon and a combination thereof.

10. The connecting structure of claim 4, wherein said non-spherical conductive particles are formed of a material selected from a group consisting of gold, silver, copper, aluminum, nickel, stainless steel, carbon and a combination thereof.

11. The connecting structure of claim 7, wherein said non-spherical conductive particles are formed of a material selected from a group consisting of gold, silver, copper, aluminum, nickel, stainless steel, carbon and a combination thereof.

12. The connecting structure of claim 1, wherein said non-spherical conductive particle has a height-to-width ratio between about 0.2 and 1.

13. The connecting structure of claim 4, wherein said non-spherical conductive particle has a height-to-width ratio between about 0.2 and 1.

14. The connecting structure of claim 7, wherein said non-spherical conductive particle has a height-to-width ratio between about 0.2 and 1.

15. The connecting structure of claim 1, wherein the shape of said non-spherical conductive particle is elliptical, flat, sheet, fibred or irregular.

16. The connecting structure of claim 4, wherein the shape of said non-spherical conductive particle is elliptical, flat, sheet, fibred or irregular.

17. The connecting structure of claim 7, wherein the shape of said non-spherical conductive particle is elliptical, flat, sheet, fibred or irregular.

* * * * *